(12) United States Patent
Kessel

(10) Patent No.: US 10,982,799 B2
(45) Date of Patent: Apr. 20, 2021

(54) SEAL-OFF FITTING WITH FLAME-PATH CONTROL

(71) Applicant: Robroy Industries—Texas, LLC, Gilmer, TX (US)

(72) Inventor: Amanda Lynn Kessel, Tyler, TX (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 214 days.

(21) Appl. No.: 16/003,525

(22) Filed: Jun. 8, 2018

(65) Prior Publication Data

US 2018/0356013 A1 Dec. 13, 2018

Related U.S. Application Data

(60) Provisional application No. 62/517,557, filed on Jun. 9, 2017.

(51) Int. Cl.
| | | |
|---|---|---|
| *F16L 55/10* | (2006.01) | |
| *F16L 15/00* | (2006.01) | |
| *F16L 58/18* | (2006.01) | |
| *H02G 3/08* | (2006.01) | |
| *A62C 4/00* | (2006.01) | |
| *H02G 3/04* | (2006.01) | |
| *A62C 3/16* | (2006.01) | |

(52) U.S. Cl.
CPC .............. *F16L 15/008* (2013.01); *A62C 4/00* (2013.01); *F16L 58/182* (2013.01); *H02G 3/0412* (2013.01); *H02G 3/088* (2013.01); *A62C 3/16* (2013.01)

(58) Field of Classification Search
CPC ........ F16L 58/182; F16L 15/008; A62C 4/00; A62C 3/16
USPC ........................................... 138/146, 145, 92
See application file for complete search history.

(56) References Cited

U.S. PATENT DOCUMENTS

| | | | | |
|---|---|---|---|---|
| 214,076 | A * | 4/1879 | Allison ................. | F16L 15/008 |
| | | | | 285/355 |
| 520,988 | A * | 6/1894 | Harrington ........... | F16L 58/182 |
| | | | | 285/55 |
| 1,484,469 | A * | 2/1924 | Brucelarie .............. | F16L 45/00 |
| | | | | 138/92 |
| 2,084,209 | A * | 6/1937 | McIlroy .................. | F16L 58/08 |
| | | | | 285/55 |
| 2,646,822 | A * | 7/1953 | Ferguson .............. | F16L 58/182 |
| | | | | 285/55 |
| 3,724,706 | A * | 4/1973 | Slocum .................. | H02G 3/088 |
| | | | | 220/3.8 |
| 5,621,189 | A * | 4/1997 | Dodds .................. | H02G 3/0418 |
| | | | | 174/17 CT |

(Continued)

*Primary Examiner* — James F Hook
(74) *Attorney, Agent, or Firm* — The Webb Law Firm

(57) ABSTRACT

A seal-off fitting for a conduit system includes a conduit body defining an inner cavity, at least one conduit port adapted to receive a conduit, and at least one threaded sealing port. The seal-off fitting further includes a threaded seal-off cover engageable with the sealing port, a first coating applied to at least a portion of the conduit body, and a second coating applied to at least of portion of the seal-off cover. At least a portion of the threads of the sealing port and at least a portion of the threads the seal-off cover remain uncoated, with the uncoated threads of the sealing port and the uncoated threads of the seal-off cover defining a flame path for flue gases exiting the conduit body.

12 Claims, 17 Drawing Sheets

(56) References Cited

U.S. PATENT DOCUMENTS

| | | | | |
|---|---|---|---|---|
| 5,654,525 A | * | 8/1997 | Starozik | H02G 3/0481 |
| | | | | 174/481 |
| 5,701,935 A | * | 12/1997 | Vasudeva | F16L 41/082 |
| | | | | 138/89 |
| 2002/0110467 A1 | * | 8/2002 | Henderson | F01C 21/0818 |
| | | | | 418/2 |

* cited by examiner

SEAL-OFF FITTING WITH FLAME-PATH CONTROL

CROSS-REFERENCE TO RELATED APPLICATIONS

The present application claims priority to U.S. Provisional Patent Application No. 62/517,557, filed on Jun. 9, 2017 and entitled "Seal-Off Fitting with Flame-Path Control", the disclosure of which is hereby incorporated in its entirety by reference.

BACKGROUND OF THE INVENTION

Field of the Invention

The present disclosure generally relates to tooling and methods for regulating the thickness of a coating applied around a threaded port of a conduit fitting. In addition, the present disclosure relates to a coated component of a seal-off conduit fitting produced using the tooling and methods disclosed herein.

Description of Related Art

Conduit is a well-known protective covering and routing path for use with electrical wire and cable in both commercial and residential applications. Electrical installments utilizing conduit typically include lengths of conduit connected by various types of fittings. Conduit is offered in a variety of metal, plastic, and composite materials, and is selected based on the needs of a particular application. Additionally, a multitude of governing bodies promulgate regulations requiring that conduit used in specific applications meets certain minimum requirements. For example, in certain applications, metal conduit and conduit fittings must be coated either externally, internally, or both to inhibit corrosion and/or oxidation.

In some installations, the conduit system is required to be "explosion-proof" such that an electrical fire caused by sparking of the wires inside a conduit is contained within the conduit. Explosion-proof conduit systems generally employ seal-off fittings incrementally spaced along the length of the conduit runs. The seal-off fittings are filled with a sealing compound, such as cement or foam, such that a fire or explosion is contained between two subsequent seal-off fittings, and cannot advance throughout the entire conduit system.

In addition, explosion-proof conduit systems must provide a means for flue gases to cool and escape from the conduit to relieve excess pressure in the event of a fire or explosion within the conduit. To this end, seal-off fittings are typically provided with a threaded port into which a threaded plug or lid is installed. In the event of an explosion within the conduit, flue gases are able to circulate out of the fitting between the threads of the port and the plug. The path through the threaded connection of the seal-off fitting, which is generally referred to herein as the flame path, provides sufficient distance for escaping flue gases to cool before exiting into the atmosphere.

To ensure that the flame path is sufficiently long and has a sufficiently narrow interstice to cool the escaping flue gases, the plug or lid must be installed to a precise depth in the threaded port of the seal-off fitting. Accordingly, industry regulations dictate that National Pipe Thread (NPT) connections have a minimum engagement of five threads, while straight thread connections have a minimum engagement of seven threads.

Achieving sufficient thread engagement is particularly complicated for coated seal-off fittings, because the thickness of the coating around the threaded port can make it difficult to ascertain if the plug or lid is installed to the required depth. In particular, excessive application of the coating around the periphery of the threaded port can make it appear that a plug is installed deeper in the port than it is actually installed. For example, an NPT plug may be installed with only four threads engaging the seal-off fitting, and a fifth engaging an overly thick coating. In this case, the plug would visually appear to be properly installed, but would actually have less than the minimum thread engagement and create a potential hazard in the event of an explosion inside the conduit.

Further complicating proper installation of the seal-off fitting, current methods of applying coatings to explosion-proof conduit fittings often produce a sleeve around the threaded port which visually obstructs installation of the plug. As such, it is difficult or impossible to visually determine how deep the plug is installed into the port.

Thus, there exists a need for devices and methods which regulate the thickness of a coating applied to a seal-off fitting such that the coating does not interfere with the installation of a plug or lid into a threaded port of the fitting.

SUMMARY OF THE INVENTION

In light of the deficiencies of the prior art, it is an object of the present disclosure to provide a seal-off fitting which is explosion-proof and requires only simple visual or mechanical inspection to validate proper assembly of the various components thereof.

Aspects or embodiments of the present disclosure are directed to a seal-off fitting for a conduit system including a conduit body defining an inner cavity, at least one conduit port adapted to receive a conduit, and at least one threaded sealing port. The seal-off fitting further includes a threaded seal-off cover engageable with the sealing port, a first coating applied to at least a portion of the conduit body, and a second coating applied to at least of portion of the seal-off cover. At least a portion of the threads of the sealing port and at least a portion of the threads the seal-off cover remain uncoated, with the uncoated threads of the sealing port and the uncoated threads of the seal-off cover defining a flame path for flue gases exiting the conduit body.

In some aspects or embodiments, the seal-off cover includes a plug. At least a top portion of the threads of the plug are coated by the second coating. The first coating is tapered around a periphery of the sealing port to a minimum thickness directly adjacent to the threads of the sealing port.

In some aspects or embodiments, the seal-off cover includes a lid. The first coating is not deposited on an internal tapered surface surrounding the sealing port. The second coating is not deposited on an external tapered surface of the lid corresponding to the internal tapered surface surrounding the sealing port.

In some aspects or embodiments, the seal-off fitting further includes a sealing compound deposited in the inner cavity and at least partially isolating the at least one conduit port from another component of the conduit system.

Other aspects or embodiments of the present disclosure are directed to a coating plug for regulating the application of a coating around a periphery of a port of a conduit body. The coating plug includes a threaded portion engageable with a threaded port of the conduit body. The threaded portion prohibits the coating from being deposited on corresponding threads of the port. The coating plug further includes a tapered portion extending radially outwardly from and away from the threaded portion, and a driving portion located opposite the threaded portion and adapted to receiving a driving tool.

In some aspects or embodiments, the coating plug further includes a cylindrical shank body between the threaded portion and the tapered portion.

In some aspects or embodiments, the tapered portion includes a conical surface.

Other aspects or embodiments of the present disclosure are directed to a system for regulating the application of a coating to a seal-off fitting including a conduit body and a seal-off plug. The system includes a coating plug for regulating the application of the coating to the conduit body of the seal-off fitting, and a plug-coating plate for regulating the application of the coating to the seal-off plug of the seal-off fitting. The coating plug includes a threaded portion engageable with a threaded port of the conduit body, the threaded portion prohibiting the coating from being deposed on corresponding threads of the port. The coating plug further includes a tapered portion extending radially outwardly from and away from the threaded portion. The plug-coating plate includes a generally flat member having at least one aperture extending therethrough, the at least one aperture adapted to receive the seal-off plug of the seal-off fitting. The at least one aperture includes a threaded portion extending at least partially through the aperture and engageable with an external thread of the seal-off plug of the seal-off fitting.

In some aspects or embodiments, the coating plug further includes a driving portion located opposite the threaded portion and adapted to receiving a driving tool.

In some aspects or embodiments, the coating plug further includes a cylindrical shank body between the threaded portion and the tapered portion.

In some aspects or embodiments, the tapered portion of the coating plug includes a conical surface.

In some aspects or embodiments, the generally flat member of the plug-coating plate has a thickness of less than the length of the seal-off plug of the seal-off fitting.

In some aspects or embodiments, the at least one aperture of the plug-coating plate is tapered to regulate the depth at which the seal-off plug of the seal-off fitting may be inserted into the at least one aperture.

In some aspects or embodiments, the at least one aperture of the plug-coating plate has a minimum pitch diameter at an underside of the generally flat member. The seal-off plug of the seal-off fitting has minimum pitch diameter at a bottom surface of the seal-off plug. The minimum pitch diameter of the at least one aperture of the plug-coating plate is substantially equal to the minimum pitch diameter of the seal-off plug, such that the bottom surface of the seal-off plug sits flush with the underside of the generally flat member of the plug-coating plate when the seal-off plug is installed in the generally flat member.

In some aspects or embodiments, the generally flat member of the plug-coating plate has a thickness such that, when the seal-off plug is installed in the generally flat member, a portion of the seal-off plug protrudes from the generally flat member.

In some aspects or embodiments, the system further includes a straight edge tool configured to contact the conduit body on diametrically opposite sides of the seal-off plug when the seal-off plug is installed into a port of the conduit body.

Other aspects or embodiments of the present disclosure are directed to a coating ring for regulating the application of a coating to a seal-off fitting including a conduit body and a seal-off lid. The coating ring includes an inner threaded portion configured to be installed on a threaded portion of the seal-off lid, the inner threaded portion extending at least partially along an axial length of the coating ring, and an outer tapered surface configured to engage an internal tapered surface of the conduit body when the seal-off lid is installed in the conduit body with the coating ring installed on the seal-off lid.

In some aspects or embodiments, the coating ring further includes an inner tapered surface configured to engage an external tapered surface of the seal-off lid when the coating ring is installed on the seal-off lid, the inner tapered surface extending at least partially along the axial length of the coating ring.

In some aspects or embodiments, the outer tapered surface extends over substantially the entire axial length of the coating ring.

In some aspects or embodiments, the inner threaded portion extends along the axial length of the coating ring beginning at an end of the coating ring having a smallest outer diameter, and the inner tapered surface extends along the axial length of the coating ring beginning at an end of the coating ring having a largest outer diameter.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the device of the present disclosure. As used in the specification and the claims, the singular form of "a", "an", and "the" include plural referents unless the context clearly dictates otherwise.

DESCRIPTION OF THE INVENTION

Figure 1:
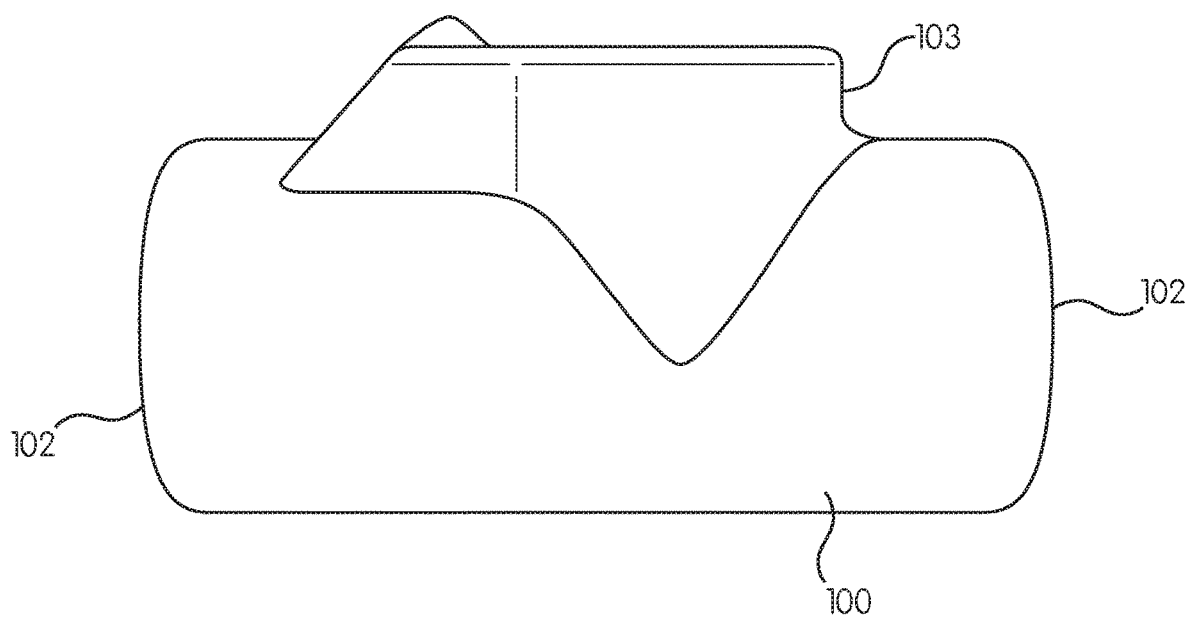
FIG. 1 is a side view of a conduit body as is known in the art.

For purposes of the description hereinafter, terms such as "upper", "lower", "right", "left", "vertical", "horizontal", "top", "bottom", "lateral", "longitudinal", and derivatives thereof shall relate to the device of the present disclosure as it is oriented in the drawing figures. However, it is to be understood that the device of the present disclosure may assume various alternative variations, except where expressly specified to the contrary. It is also to be understood that the specific devices illustrated in the attached drawings, and described in the following specification, are simply exemplary embodiments of the device of the present disclosure. Hence, specific dimensions and other physical characteristics related to the aspects and embodiments disclosed herein are not to be considered as limiting.

As used herein, the term "seal-off fitting" means the combination of a conduit body and an associated plug, lid, cover, or other sealing device, unless context dictates otherwise. The term "seal-off fitting" is used particularly to refer to conduit bodies and their associated sealing devices which are explosion- and/or flame-proof.

Figure 2A:
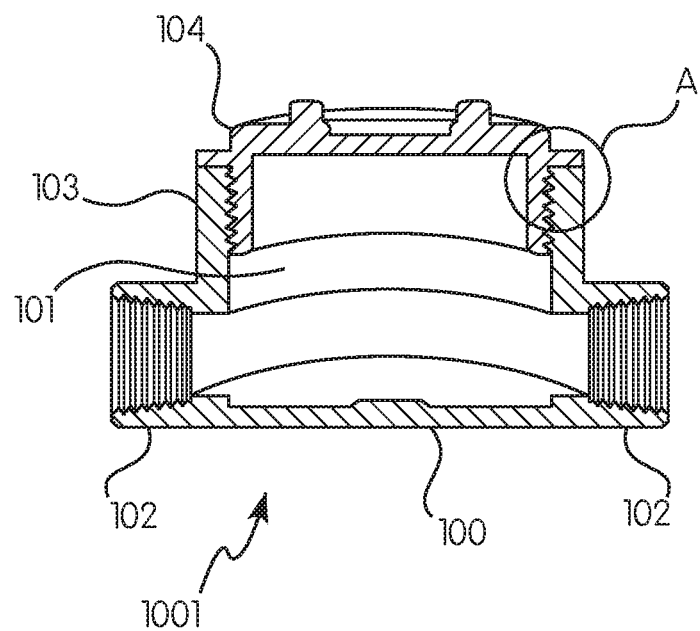
FIG. 2A is a cross-sectional view of an explosion-proof fitting.
Figure 2B:
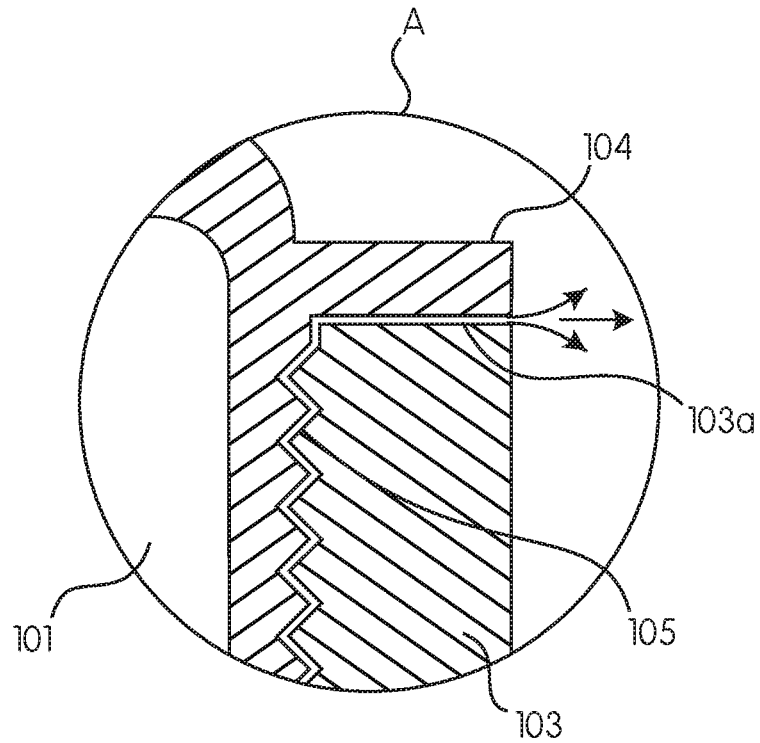
FIG. 2B is an enlarged view of detail 'A' of FIG. 2A showing a flame path

Aspects of the present disclosure are generally directed to seal-off fittings and to tooling for regulating the application of a coating to such seal-off fittings. Referring to FIG. 1, a conventionally known conduit body 100 for use in a seal-off fitting generally includes at least one conduit port 102 adapted to receive tubular conduit, for example via a threaded connection, and a sealing port 103 which also includes a threaded connection. As shown in FIGS. 2A-2B, the sealing port 103 is adapted to receive a threaded seal-off cover 104, such as a plug or lid. The combination of the conduit body 100 and the seal-off cover 104 defines a seal-off fitting 1000. With continued reference to FIG. 2B, an interface between the threaded portions of the sealing port 103 and the seal-off cover 104 define a flame path 105 leading from an inner cavity 101 of the conduit body 100 to the outside atmosphere. In particular, air may evacuate the conduit body 100 by traveling along the flame path 105 and exiting between the seal-off cover 104 and a peripheral surface 103a of the sealing port 103.

Figure 3:
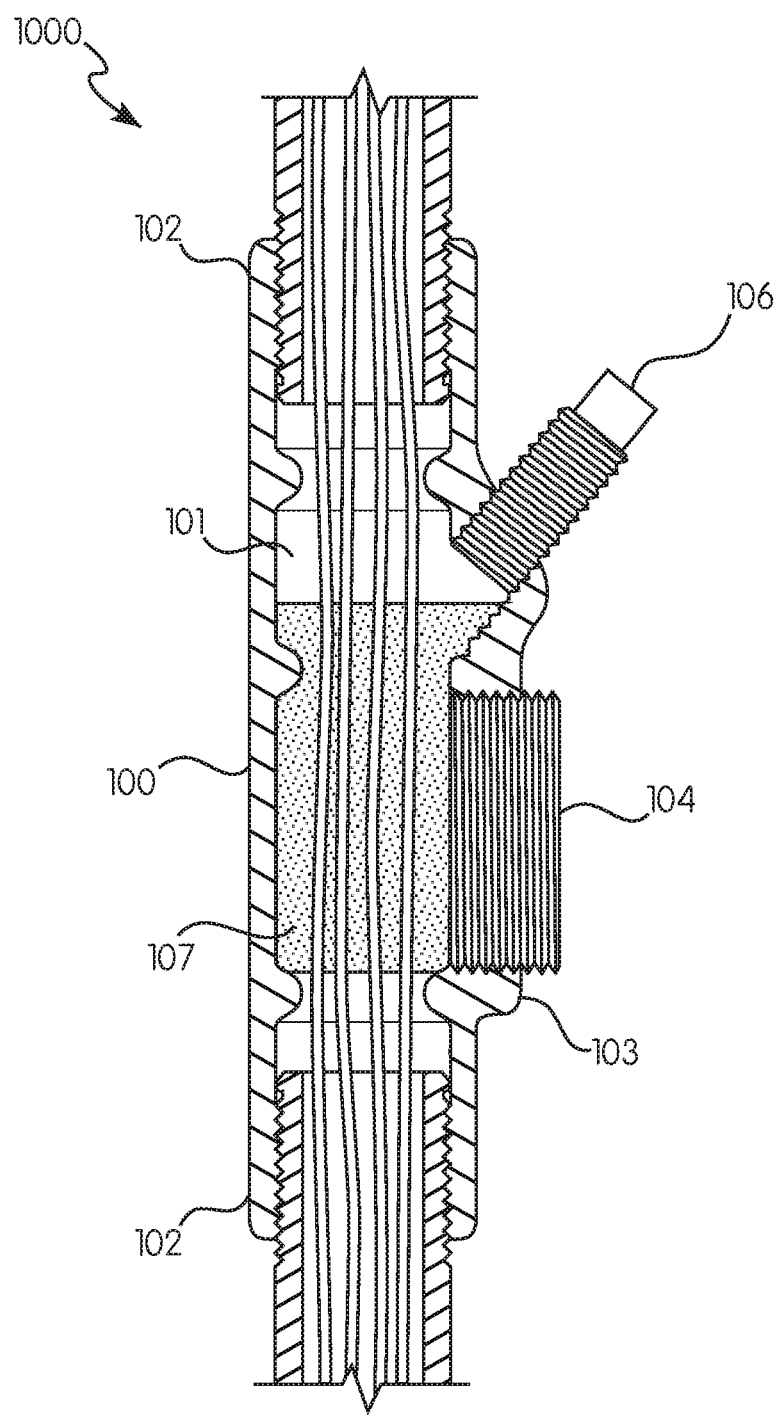
FIG. 3 is a cross-sectional view of a seal-off fitting in a conduit installation.

Referring now to FIG. 3, the conduit body 100 may include additional features such as a fill port 106 through which a sealing compound 107 may be injected into the inner cavity 101 of the conduit body 100. The sealing compound 107, which may be, for example, foam or cement, isolates sections of the conduit system on either side of the conduit body 100, thereby preventing fires and/or explosions from propagating throughout the entire conduit system.

Figure 4:
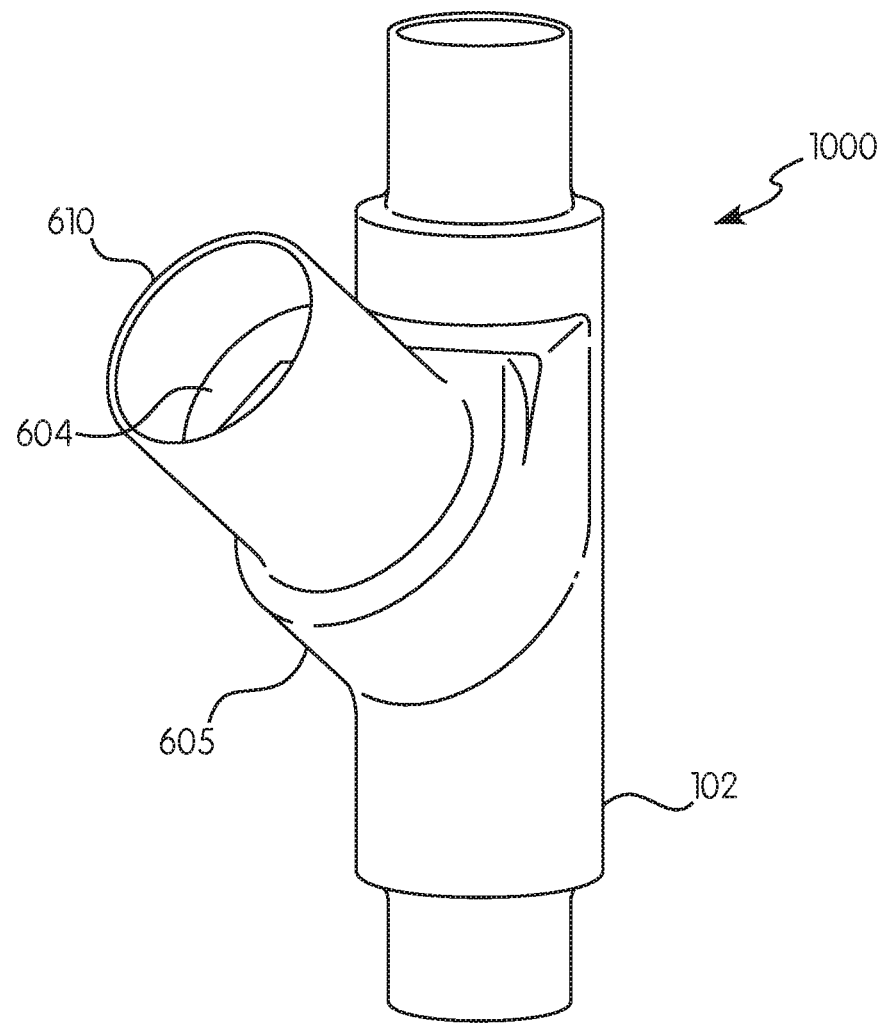
FIG. 4 is a perspective view of a coated seal-off fitting as is known in the art.

Referring now to FIG. 4 some known seal-off fittings 1000 are coated to provide corrosion resistance and/or other desirable properties. A coating 605 is generally applied to a conduit body 100 and the seal-off cover 104 via a dip-molding process. The materials forming the coating 605 may be, for example, polyvinyl chloride (PVC). During the coating process, a sleeve 610 of the coating 605 may be built up around the sealing port 603 either intentionally or unintentionally. As can be appreciated from FIG. 4, the sleeve 610 obstructs the visibility of the seal-off cover 604 such that it is difficult or impossible to visually determine whether the seal-off cover 604 is installed to the proper depth to establish an explosion-proof connection with a sealing port 603.

Figure 5:
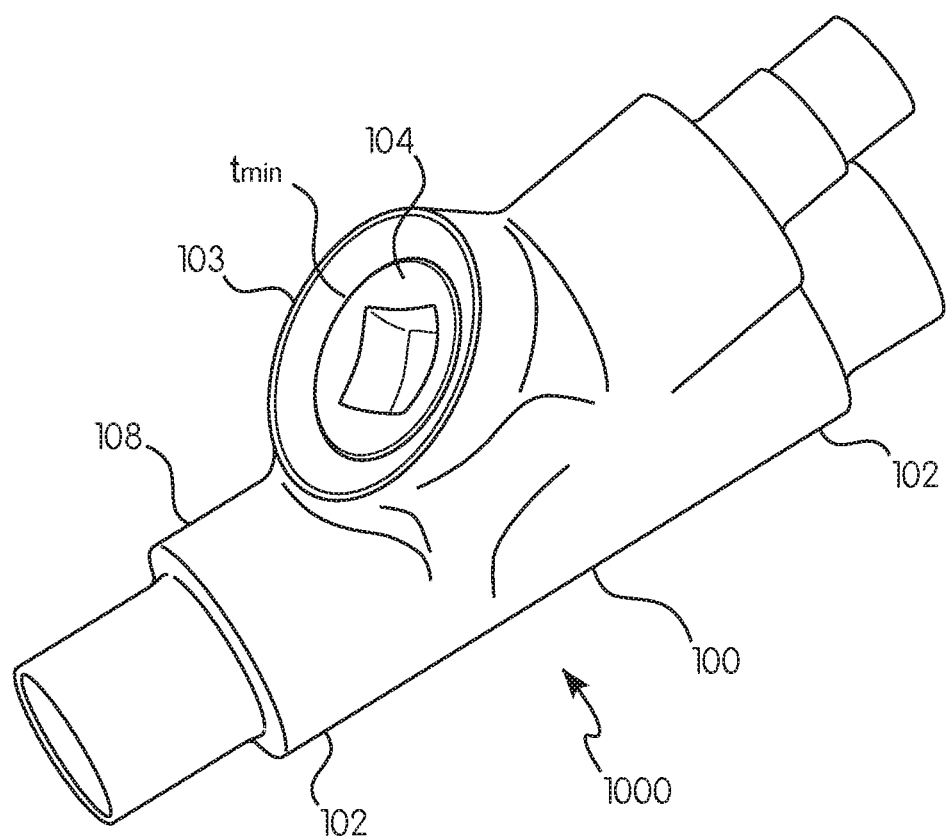
FIG. 5 is a perspective view of a coated seal-off fitting in accordance with an aspect of the present disclosure.
Figure 6:
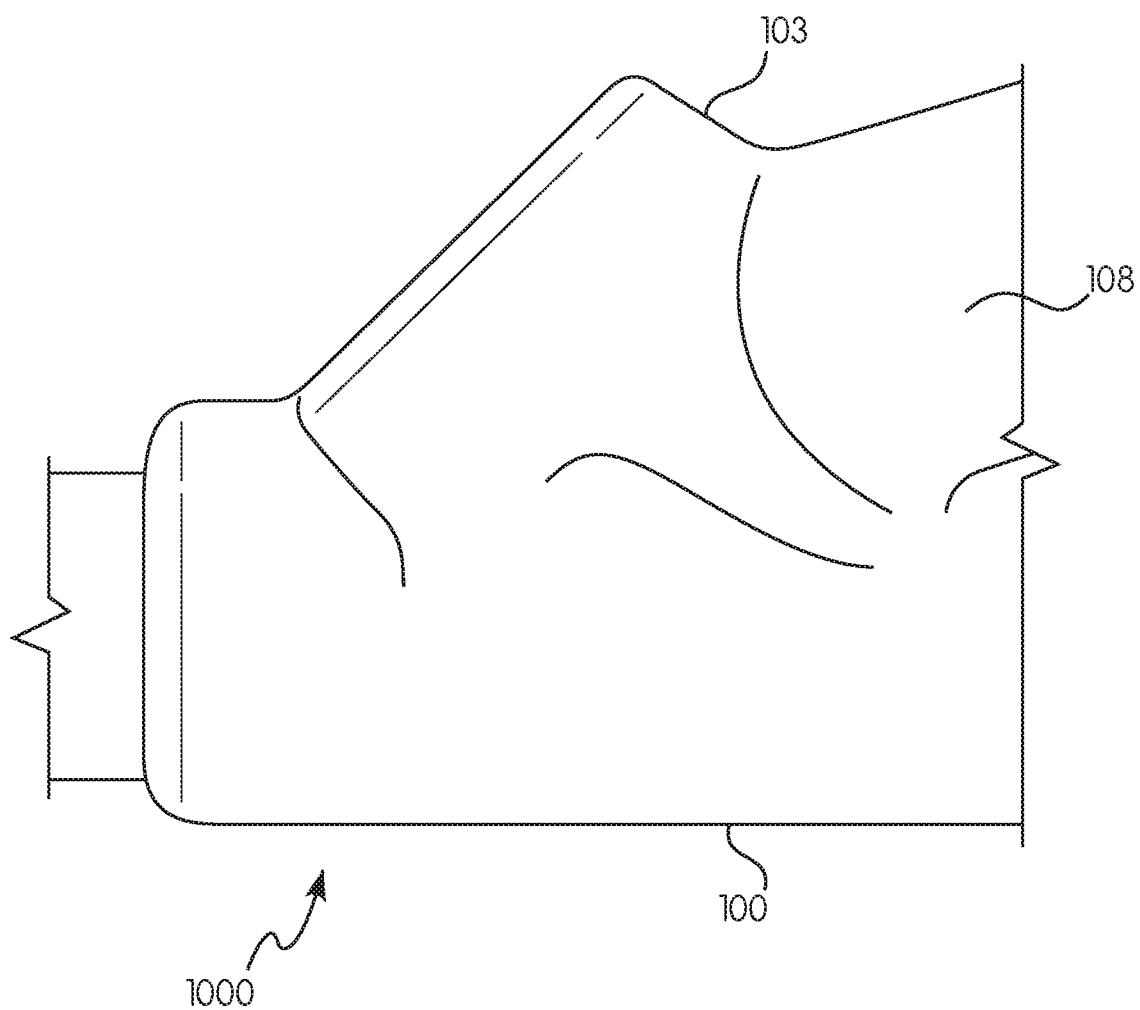
FIG. 6 is a side view of a portion of the seal-off fitting of FIG. 5.

Referring now to FIG. 5-6, a seal-off fitting 1000 according to one aspect or embodiment of the present disclosure includes an outer surface coating 108 which is applied to the conduit body 100 and/or the seal-off cover 104 using tooling to prevent the formation of sleeves and other build-ups of coating material that inhibit the visibility of the seal-off cover 104. The outer surface coating 108 may be PVC, urethane, or another coating that may be applied via spraying, dipping, or other coating processes. Additionally, the outer surface coating 108 applied to the conduit body 100 may be a different material than the outer surface coating 108 applied to the seal-off cover 104 if the outer surface coating 108 is applied to the conduit body 100 and the seal-off cover 104 in different processes. For example, the outer surface coating 108 applied to the conduit body 100 may be PVC while the outer surface coating 108 applied to the seal-off cover 104 may be urethane. In the aspect shown in FIGS. 5-6, the seal-off cover 104 is a plug. However, in other aspects of the disclosure which will be described later with reference to FIGS. 15-17, the seal-off cover 104 may be a lid or other like structure. Regardless of whether seal-off cover 104 is a plug, lid, or other structure, the threads of the sealing port 103 are left uncoated so as to not interfere with installation of the seal-off cover 104 into the sealing port 103. The exposed portions of the seal-off cover 104 which are exposed when the seal-off cover 104 is installed in the conduit body 100 are coated by the outer surface coating 108. The threaded portion of the seal-off cover 104 that engages the threads of the sealing port 103 are left uncoated so as to not interfere with installation of the seal-off cover 104 into the sealing port 103. Thus, when the seal-off cover 104 is properly installed in the sealing port 103, all visible external surfaces of the seal-off fitting 1000, including the visible external surfaces of both the conduit body 100 and the seal-off cover 104, are covered by the surface coating 108. The seal-off fitting 1000 may also be internally coated, for example with urethane, to inhibit rust and corrosion from the inside of the seal-off fitting 1000.

With continued reference to FIGS. 5-6, the outer surface coating 108 of the seal-off fitting 1000 is tapered down to a controlled minimum thickness $t_{min}$ directly adjacent to threads of the sealing port 103. In particular, the surface coating 108 at a location directly adjacent to the threads of the sealing port 103 is applied thinly and consistently such that the seal-off plug 104 installed into the sealing port 103 cannot be mistakenly installed so shallow that the seal-off fitting 1000 would not be explosion proof. For example, the surface coating 108 adjacent to the threads of the sealing port 103 is applied thinly enough that a view of the threads of the seal-off plug 104 from the side of the seal-off fitting 1000 (that is, the view of FIGS. 5-6) is not obstructed by a buildup of the surface coating 108 around the sealing port 103. Therefore, it is not possible to mistakenly install the seal-off plug 104 too shallow in the sealing port 103 due to an inability to observe the threaded connection between the seal-off plug 104 and the sealing port 103. Coincidentally, a simple inspection to determine that no externally visible surfaces of the conduit body 100 and the seal-off plug 104 are uncoated by the outer surface coating 108 is sufficient to determine that the seal-off plug 104 is installed to the proper depth and thread engagement with the sealing port 103. Visible surfaces of the seal-off plug 104 not covered by the outer surface coating 108 indicate improper, particularly too shallow, installation of the seal-off plug 104 in the sealing port 103.

Figure 7:
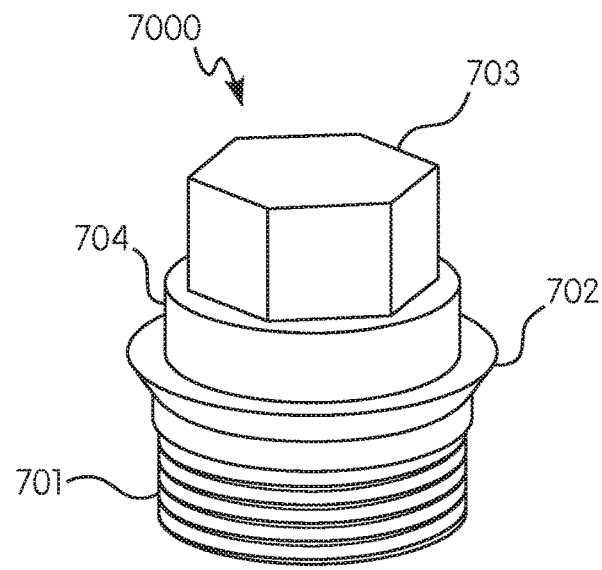
FIG. 7 is a perspective view of a coating plug in accordance with an aspect of the present disclosure.

The above-described controlled thickness of the surface coating 108 may be achieved utilizing a coating plug 7000 as shown in FIG. 7. The coating plug 7000 includes a cylindrical shank body 704 having a threaded portion 701 at one end, a driving portion 703 at an opposite end, and a tapered portion 702 therebetween. The threaded portion 701 has a thread profile engageable with the threads of the corresponding sealing port 103 of the conduit body 100 of the seal-off fitting 1000 of FIGS. 5-6. The tapered portion 702 has a generally conical surface extending outwardly from the shank body 704 and away from the threaded portion 701, for example, at an angle of 45° from a transverse cross-sectional plane of the shank body 704. The driving portion 703 may be, for example, a hex head adapted for use with a wrench, ratchet, or other driving tool.

Figure 8:
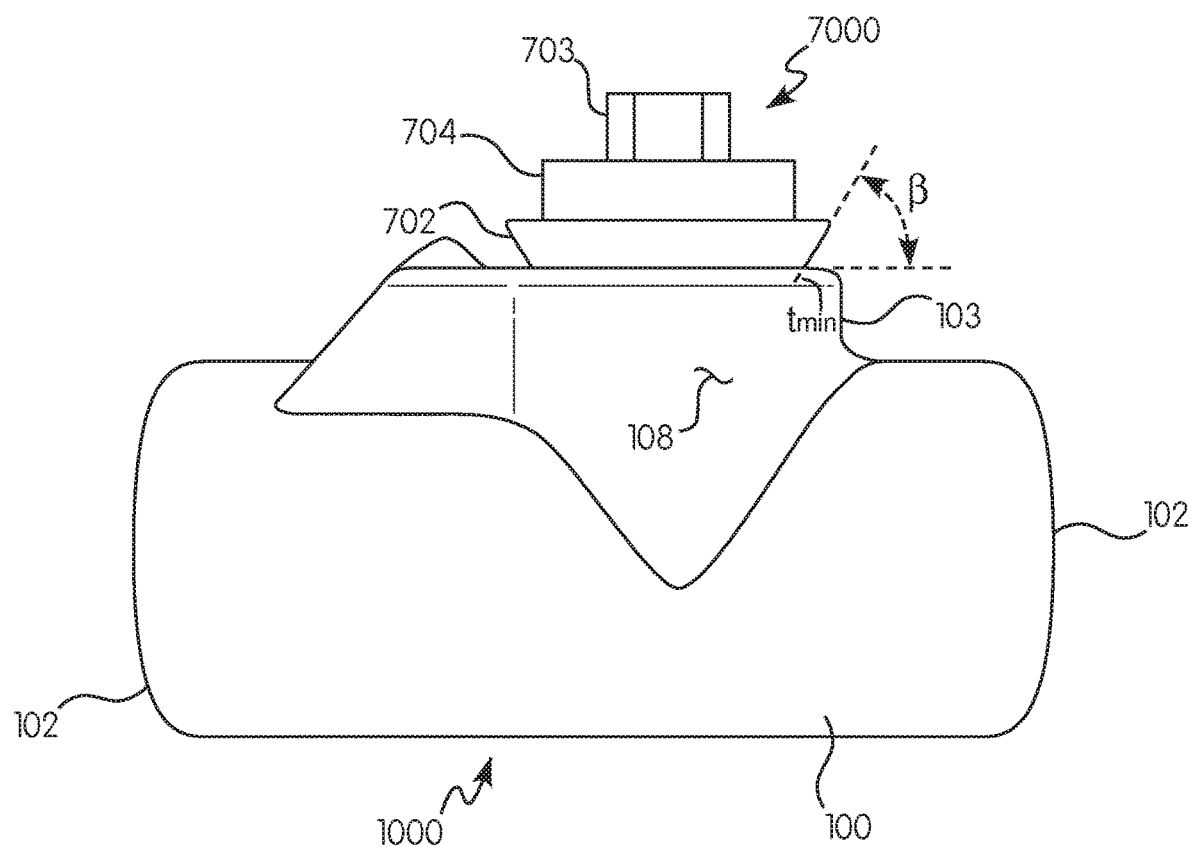
FIG. 8 is a side view of the conduit body of FIG. 1 with the coating plug of FIG. 7 installed therein.

Referring now to FIG. 8, the threaded portion 701 of the coating plug 7000 is installed into the sealing port 103 of the conduit body 100 in place of the seal-off plug 104 (not shown) prior to application of the surface coating 108 (not shown). The driving portion 703 of the coating plug 7000 facilitates installation of the coating plug 7000 into the sealing port 103 with a wrench, ratchet, or other driving tool. With the coating plug 7000 installed into the sealing port 103, the tapered portion 702 defines an acute angle β between the coating plug 7000 and a surface of the conduit body 100 adjacent the perimeter of the sealing port 103. The tapered portion 702 of the coating plug 7000 abuts the sealing port 103 of conduit body 100, thereby preventing any surface coating 108 from entering the sealing port 103. The thickness and profile of the surface coating 108 applied adjacent to the sealing port 103 is limited by the open space defined by the angle β between the coating plug 7000 and the conduit body 100. In particular, the surface coating 108 has a minimum thickness $t_{min}$ at the interface of the conduit body 100 and the tapered portion 702 of the coating plug 7000. The thickness of the surface coating 108 may gradually increase in a radial direction from the sealing port 103 as the distance between the conduit body 100 and the tapered portion 702 increases. Thus, the coating plug 7000 prevents excessive buildup of the coating 108 around the periphery of the sealing port 103. After the surface coating 108 is applied to the conduit body 100, the coating plug 7000 may be removed and the seal-off plug 104 may be installed in its place, as shown in FIGS. 5-6. Prior to removal of the coating plug 7000, the shank body 704 may be used as a knife guide for cutting excess surface coating 108 from the conduit body 100.

Figure 9:
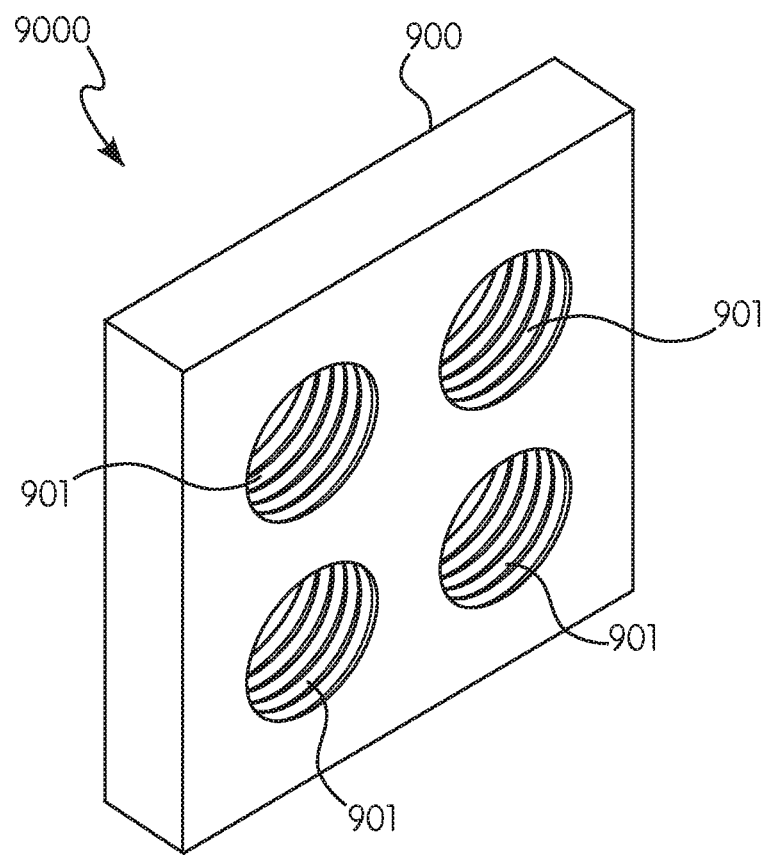
FIG. 9 is a perspective view of a plug-coating plate in accordance with an aspect of the present disclosure.
Figure 10A:
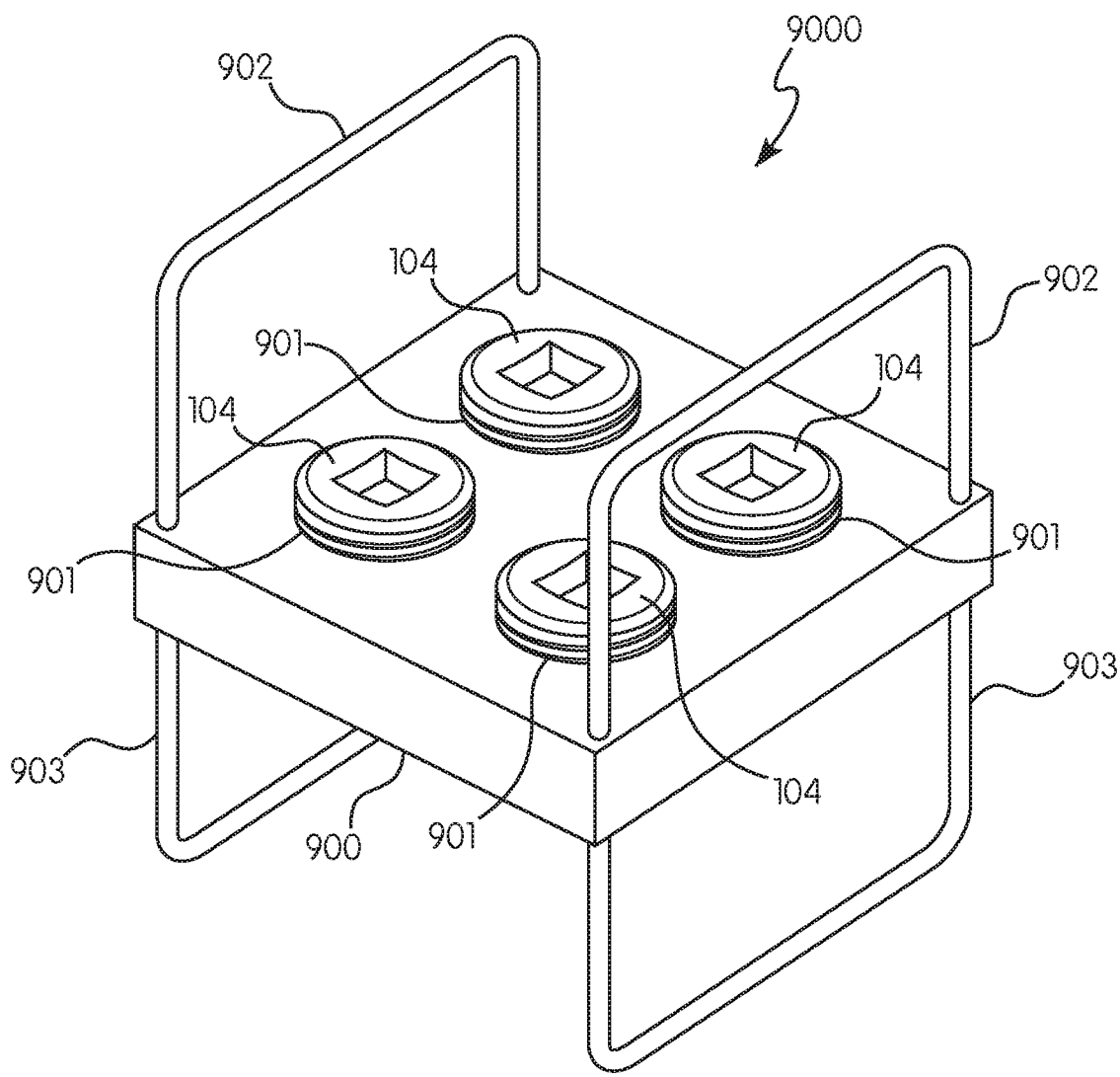
FIG. 10A is a perspective view of the plug-coating plate of FIG. 9 with a plurality of seal-off plugs inserted into the plug-coating plate.
Figure 10B:
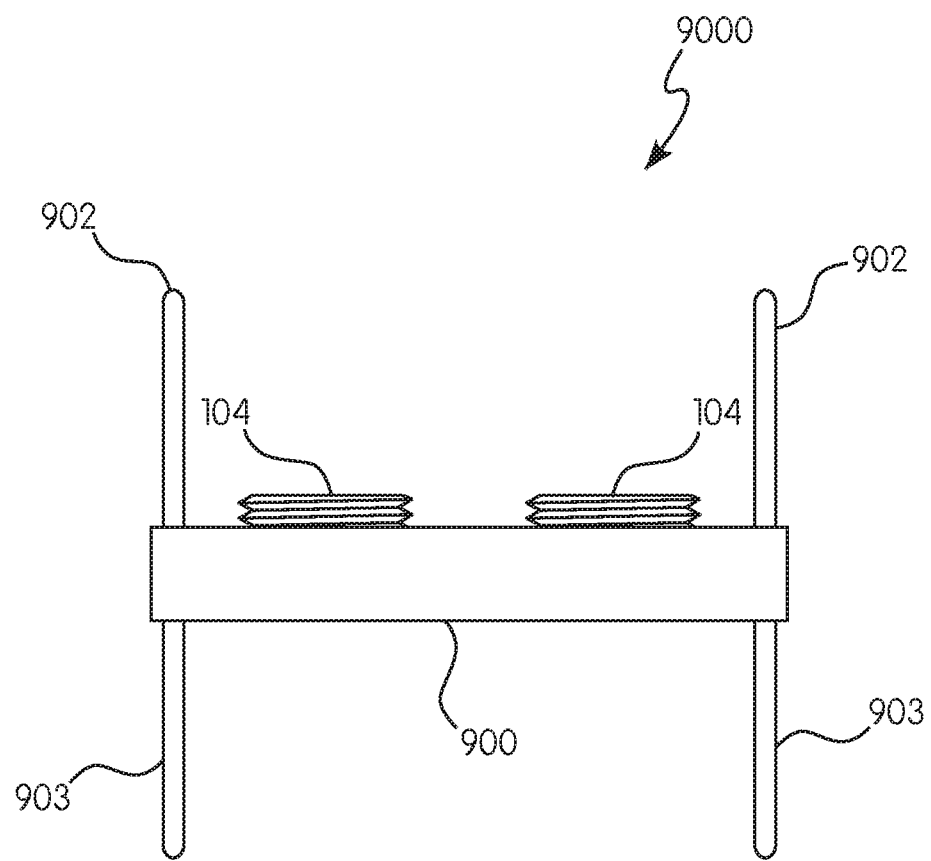
FIG. 10B is a side view of the plug-coating plate of FIG. 9 with a plurality of seal-off plugs inserted into the plug-coating plate.

Referring now to FIGS. 9-10B, other aspects of the disclosure are directed to a plug-coating plate 9000 for regulating the application of the surface coating 108 to the seal-off plug 104. The plug-coating plate 9000 includes a generally flat member 900 having one or more apertures 901 each adapted for holding a seal-off plug 104. The generally flat member 900 has a thickness less than the longitudinal length of the seal-off plugs 104, such that a portion of each seal-off plug 104 protrudes out of the generally flat member 900 when the seal-off plugs 104 are held in the generally flat member 900, as may be appreciated from FIGS. 10A-10B. Additionally, the generally flat member 900 is at least as thick as a number of threads of each seal-off plug 104 necessary to define the flame path 105 of the seal-off fitting 1000. For example, the generally flat member 900 may have a thickness of at least five threads, corresponding to the number of threads necessary to define an explosion-proof flame path 105 of the seal-off fitting 1000.

Each of the apertures 901 in the generally flat member 900 is at least partially threaded corresponding to the threads of the seal-off plugs 104. The threads of the seal-off plugs 104 and the corresponding threads of the apertures 901 may be tapered, for example according to National Pipe Thread (NPT) specification, though straight threads are also contemplated. Where tapered threads are utilized, the apertures 901 of the generally flat member 900 may have a minimum pitch diameter to control the depth of insertion of the seal-off plugs 104 into the generally flat member 900. For example, as shown in FIG. 10B, the apertures 901 may be tapered such that the seal-off plugs 104 may be inserted into the generally flat member 900 until a bottom surface of each seal-off plug 104 sits flush with an underside of the generally flat member 900. That is, the pitch diameter of the thread at the bottom surface of each seal-off plug 104 is substantially equal to the pitch diameter of the threaded aperture 901. With this arrangement, the seal-off plugs 104 are prevented from being installed into the plug-coating plate 9000 such that any portion of the seal-off plugs 104 protrude from the underside of the generally flat plate 900.

As may also be appreciated from FIGS. 10A-10B, the plug-coating plate 9000 may include one or more upper legs 902 and one or more lower legs 903 for supporting the generally flat member 900 and to facilitate handling of the plug-coating plate 9000.

Figure 11:
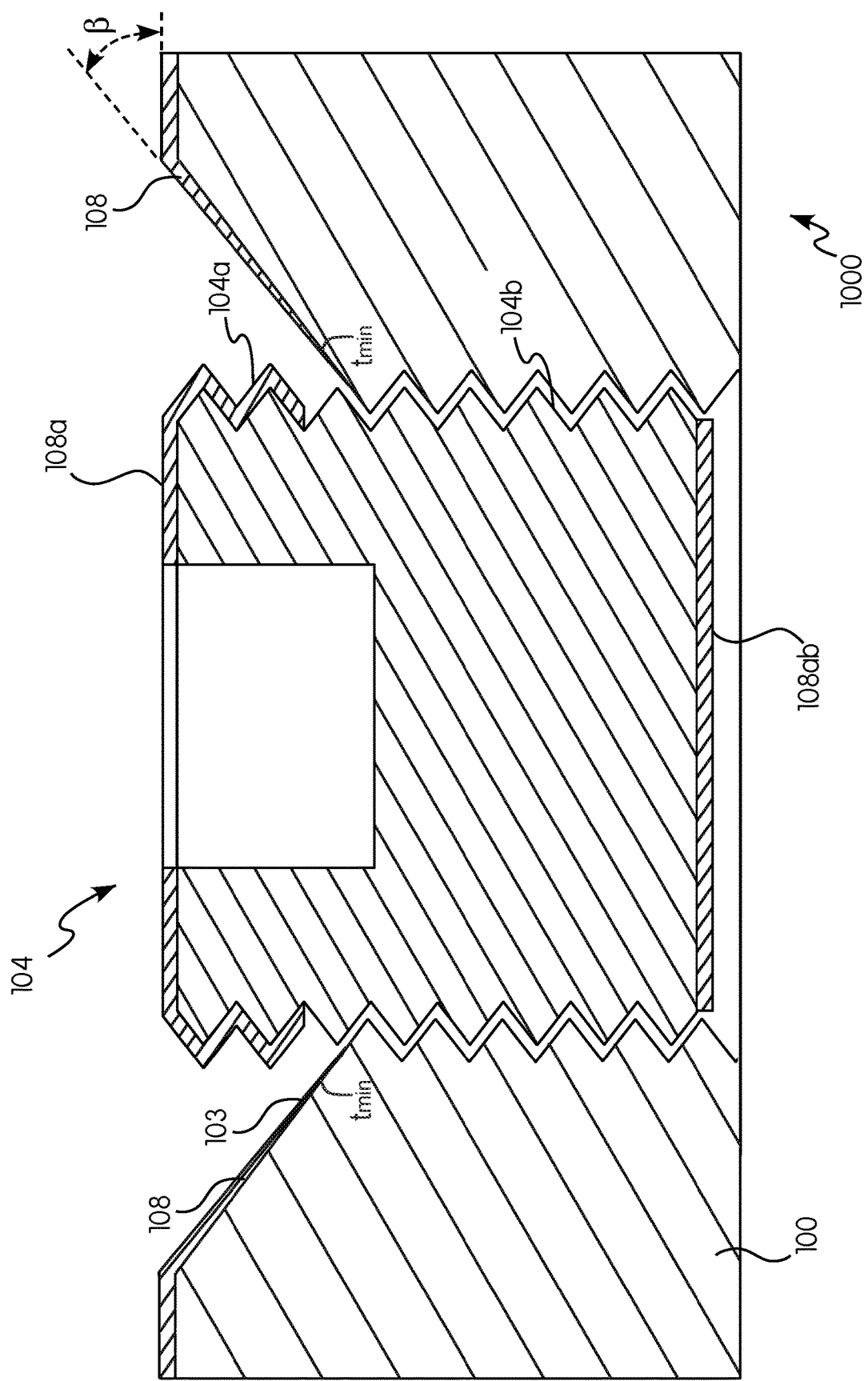
FIG. 11 is a cross-sectional view of a coated seal-off plug in accordance with an aspect of the present disclosure.

As noted above, the plug-coating plate 9000 may be utilized to coat portions of the seal-off plugs 104 installed therein. In particular, the bottom surface of the seal-off plugs 104 which sit flush with the underside of the generally flat member 900 and the portion of the seal-off plugs 104 protruding from the top side of the generally flat member 900 may be coated by, for example, a spraying process. After the coating is applied, the seal-off plugs 104 may be removed from the plug-coating plate 9000. FIG. 11 depicts a cross section of the seal-off plug 104 after coating and removal from the plug-coating plate 9000. An upper portion 104a of the seal-off plug 104, corresponding the portion of the seal-off plug 104 that protruded from the top side of the generally flat member 900, is covered by an upper surface coating 108a which may cover, for example, approximately two topmost thread courses of the seal-off plug 104. Similarly, the bottom surface of the seal-off plug 104, which was exposed from the underside of the generally flat member 900, is covered by a lower surface coating 108b. An uncoated portion 104b of the seal-off plug 104 corresponds to the portion of the seal-off plug 104 which was inserted into the generally flat member 900.

The coated seal-off plug 104 of FIG. 11 is ideally suited for use in the conduit body 100 coated using the coating plug 7000 as described above with reference to FIGS. 7-8. When installed in the sealing port 103 of the conduit body 100, the uncoated portion 104b of the seal-off plug 104 in conjunction with threads of the sealing port 103 defines the flame path 105 of the seal-off fitting 1000. Because the surface coating 108 on the conduit body 100 and the upper surface coating 108a of the seal-off plug 104 is regulated by the coating plug 7000 and plug-coating plate 9000, respectively, the risk of improper installation due to inconsistent or excessive coating application is drastically reduced or eliminated. Further, the plug-coating plate 9000 facilitates the precise coating of only those portions of the seal-off plug 104 which will be exposed after the seal-off plug 104 is install in the seal-off fitting 1000. Thus, proper depth of installation of the seal-off plug 104 can be visually validated by inserting the seal-off plug 104 into the sealing port 103 until the uncoated portion 104b is no longer visible.

Figure 12A:
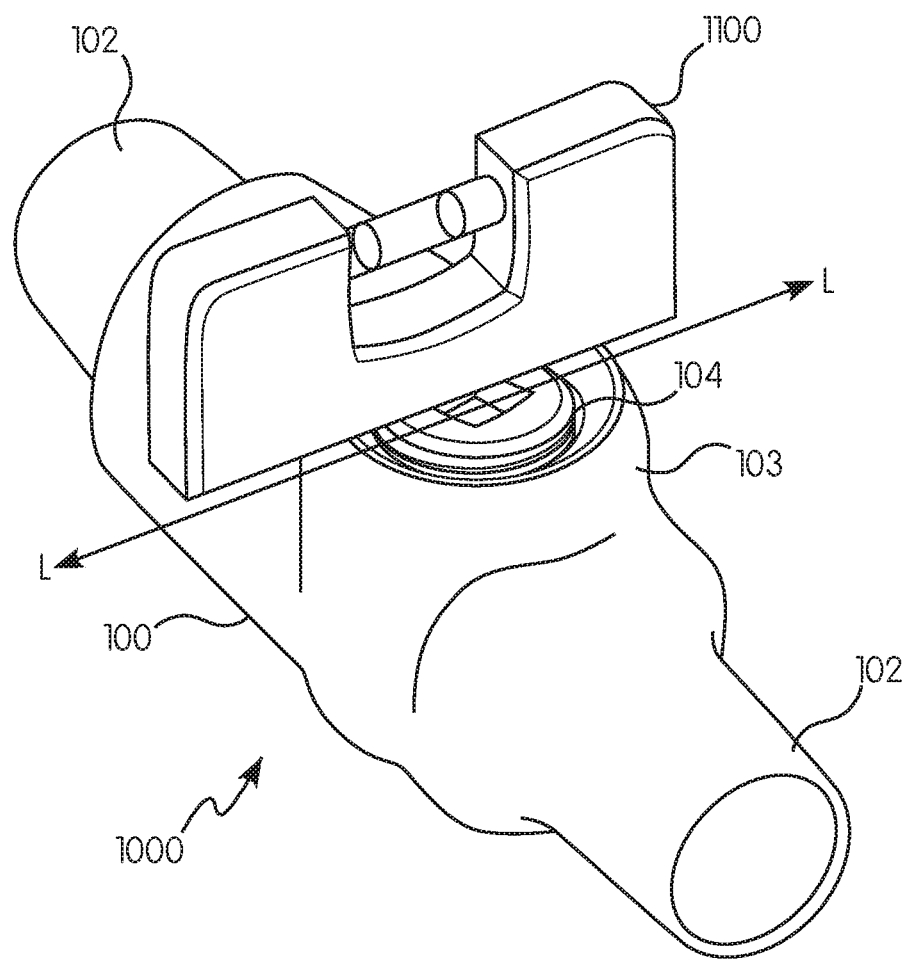
FIG. 12A is perspective view of a seal-off fitting in accordance with an aspect of the present disclosure with the seal-off plug of FIG. 11 properly installed.
Figure 12B:
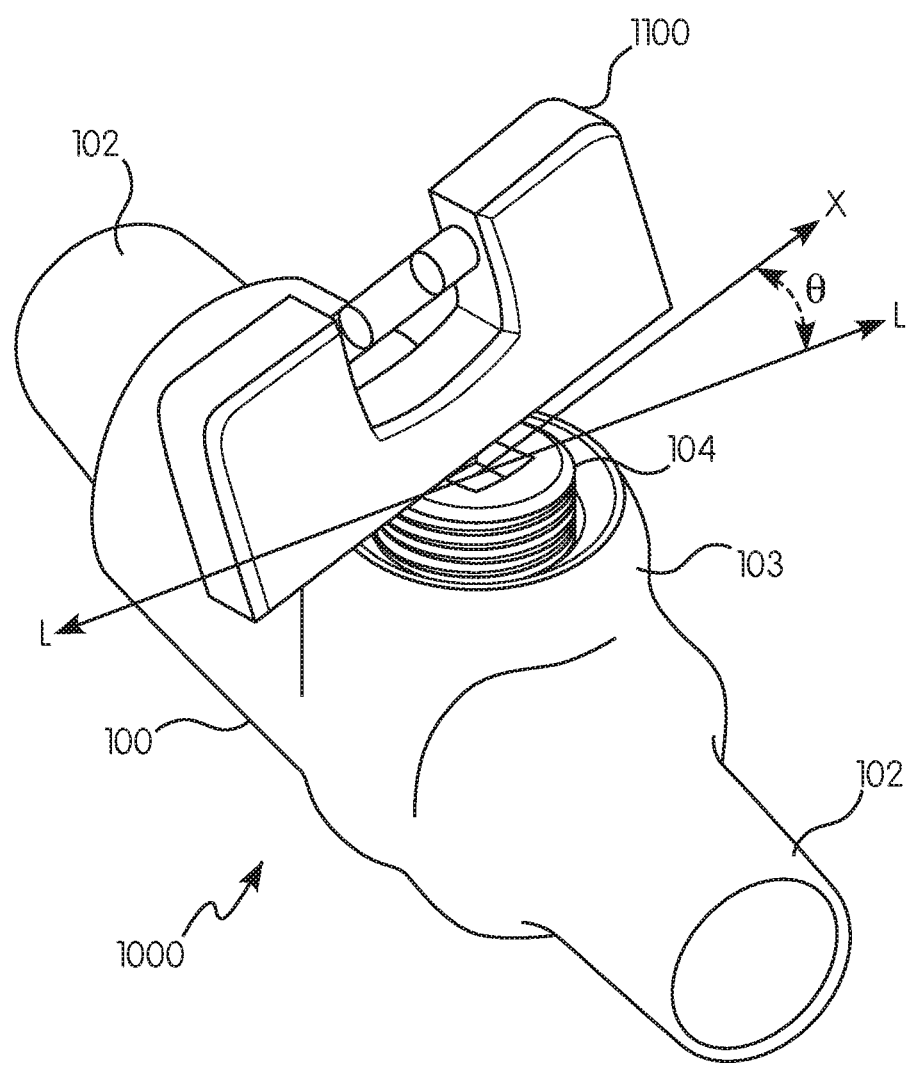
FIG. 12B is perspective view of a seal-off fitting in accordance with an aspect of the present disclosure with the seal-off plug of FIG. 11 improperly installed.

FIGS. 12A-12B illustrate an alternative method for validating proper installation of the seal-off plug 104 into the sealing port 103 of the conduit body 100. FIG. 12A shows a properly installed seal-off plug 104. A straight edge tool 1100 is placed across the sealing port 103 directly over the seal-off plug 104. The straight edge tool 1100 is oriented along a longitudinal direction L and contacts the conduit body 100 on diametrically opposite sides of the seal-off plug 104. As such, it is evident that the seal-off plug 104 is either flush with or recessed within the conduit body 100, indicating proper depth of installation of the seal-off plug 104.

FIG. 12B shows an improperly installed seal-off plug 104. In particular, the seal-off plug 104 is installed too shallow such that it protrudes beyond the conduit body 100. As such, the straight edge tool 1000 cannot be oriented along the longitudinal direction L such that the straight edge tool 1100 contacts the conduit body 100 on diametrically opposite sides of the seal-off plug 104. Instead, the straight edge tool 1100 can contact the seal-off plug 104 and the conduit body on only one side of the seal-off plug 104, orienting along a skewed direction X at an angle θ with respect to the longitudinal direction L. Resting of the straight edge tool 1100 at the angle θ relative to the longitudinal direction L thus indicates an improper installation, more particularly a too shallow installation, of the seal-off fitting into the conduit body 100.

Figure 13:
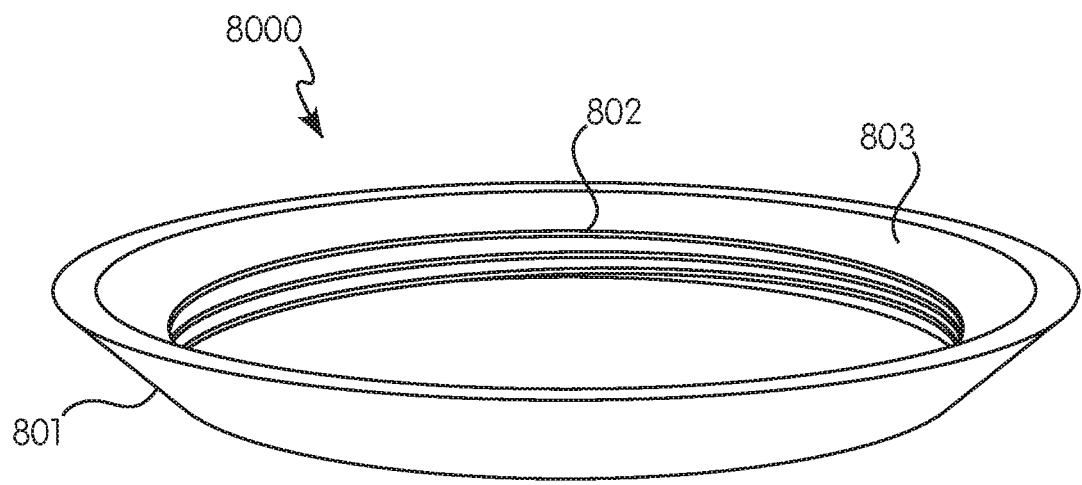
FIG. 13 is a perspective view of a coating ring in accordance with an aspect of the present disclosure.
Figure 14:
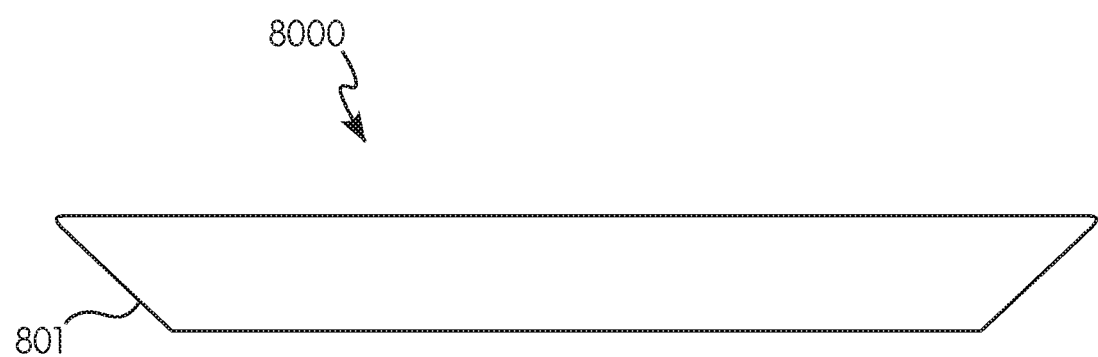
FIG. 14 is a side view of the coating ring of FIG. 13

Referring now to FIGS. 13-14, other aspects or embodiments of the present disclosure are directed to a coating ring 8000 for regulating the application of the surface coating 108 to seal-off fittings 1000 that utilize a lid instead of a plug as the seal-off cover 104. The coating ring 8000 generally includes an outer tapered surface 801, an internal threaded portion 802, and an inner tapered surface 803. The outer tapered surface 801 extends over substantially the entire axial length of the coating ring 8000. The internal threaded portion 802 extends at least partially along the axial length of the coating ring 8000, beginning from an end of the coating ring 8000 having a smallest outer diameter. The inner tapered surface 803 extends partially along the axial length of the coating ring 8000, beginning from an end of the coating ring 8000 having a largest outer diameter.

Figure 15:
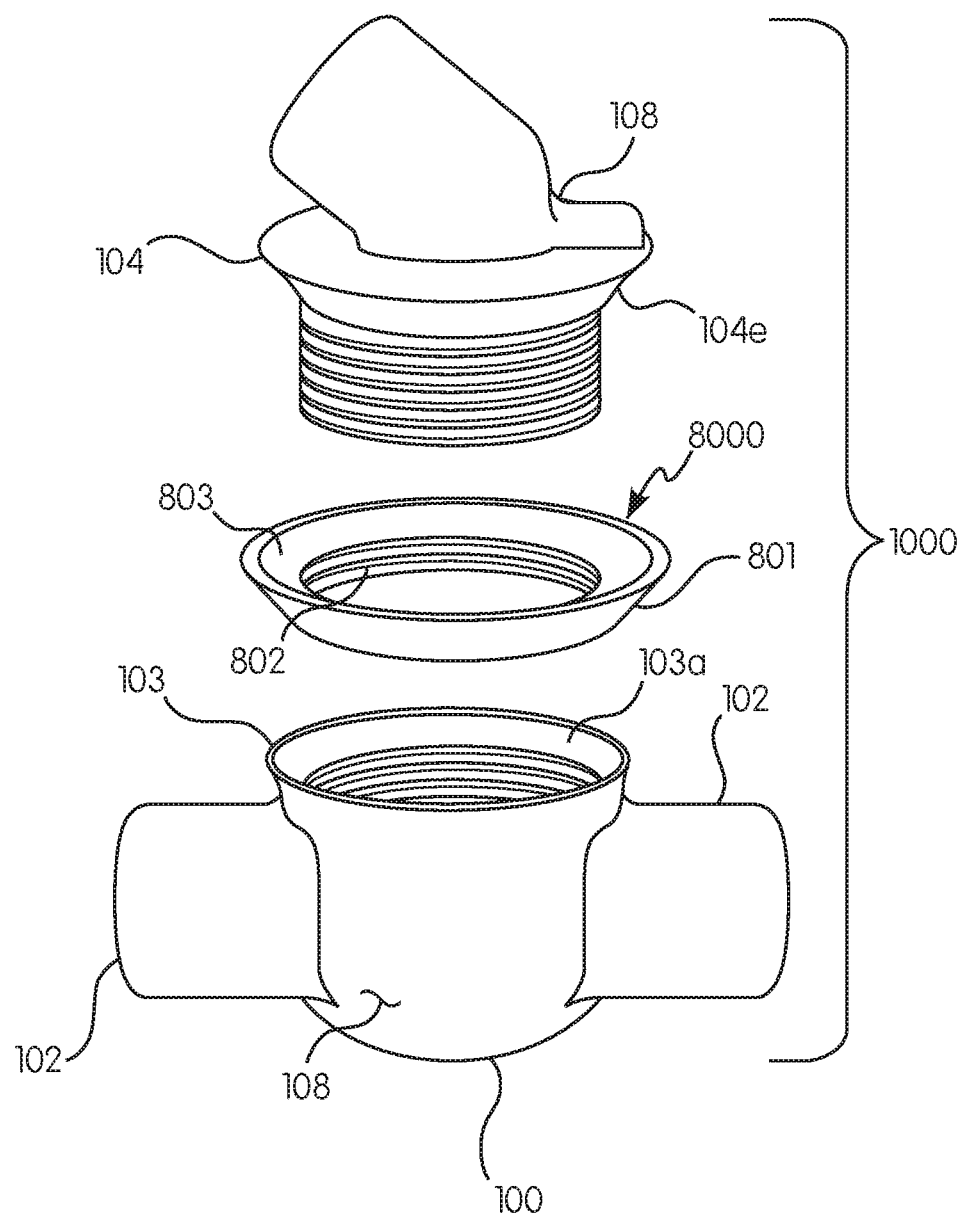
FIG. 15 is an exploded view of an uncoated seal-off fitting with the coating ring of FIG. 13 installed.
Figure 16:
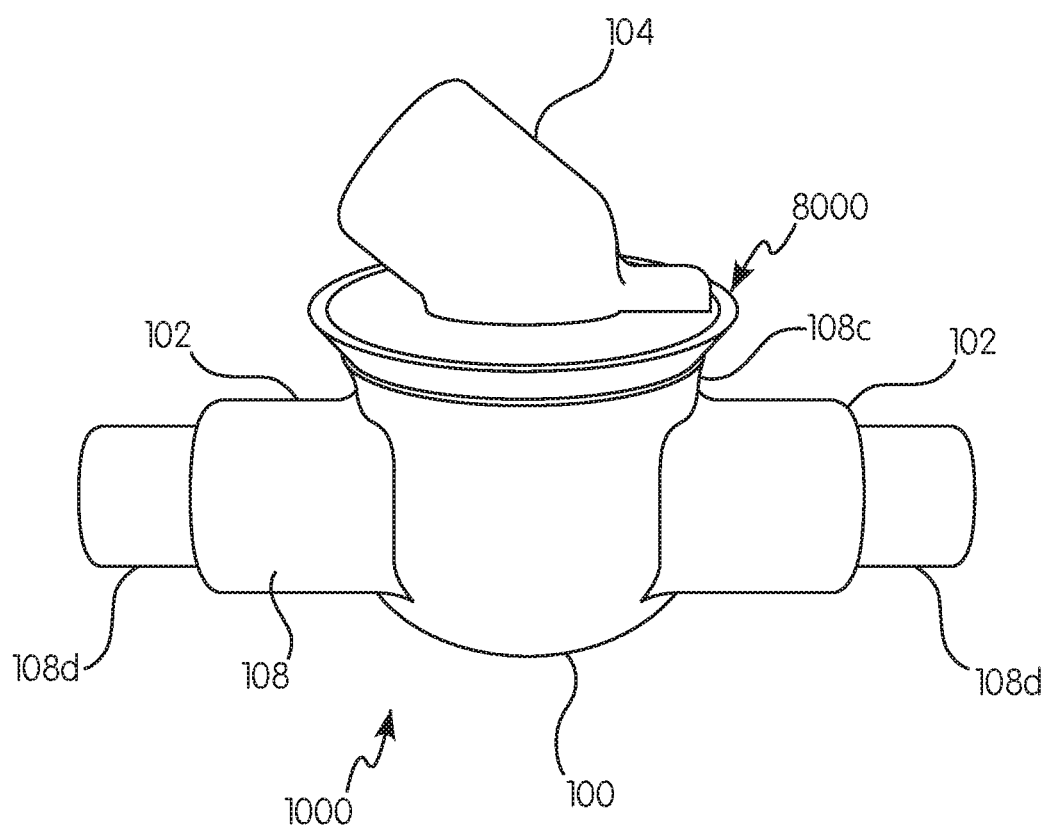
FIG. 16 is a side view of the seal-off fitting of FIG. 15 with the coating ring of FIG. 13 installed, after a coating has been applied.
Figure 17:
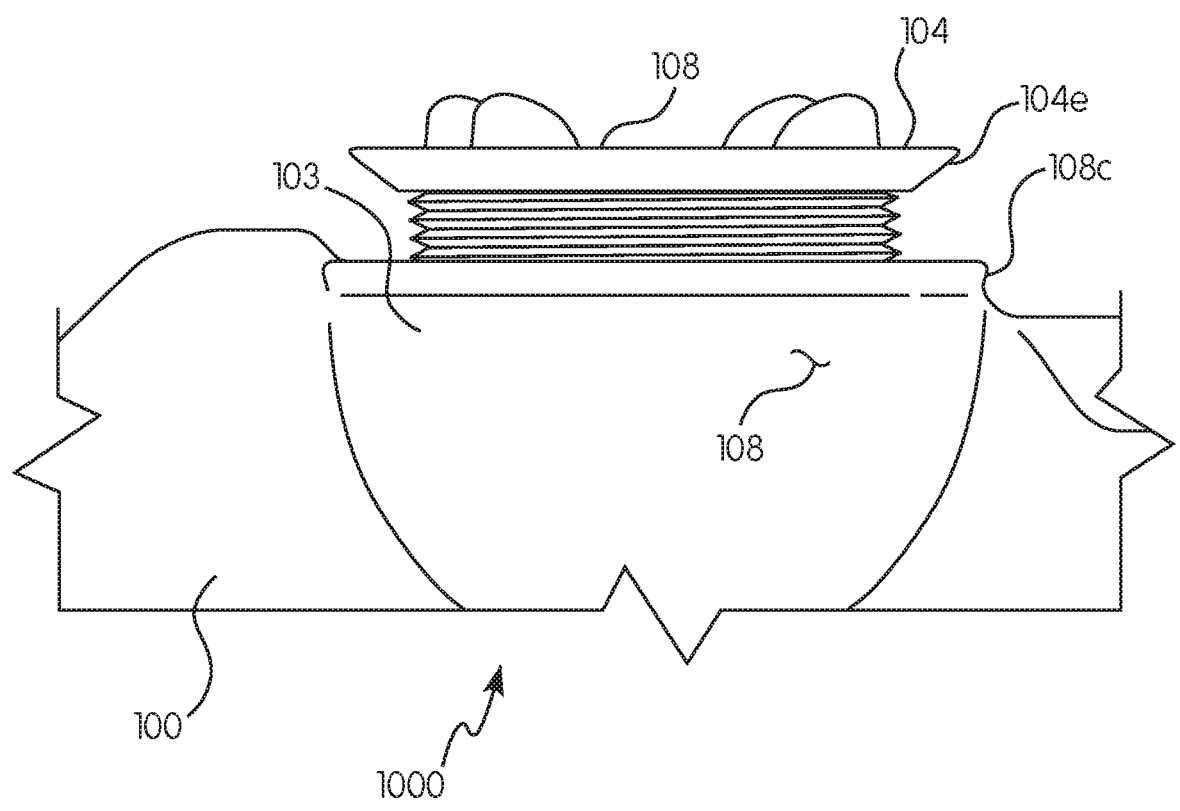
FIG. 17 is a side of a partially assembled seal-off fitting according to an aspect of the present disclosure

Referring now to FIGS. 15-17, the coating 8000 is configured to be installed between the conduit body 100 and a seal-off lid 104 prior to application of the coating 108. The inner threaded portion 802 of the coating ring 8000 is threaded onto the seal-off lid 104 until the inner tapered surface 803 of the coating ring 8000 engages a corresponding external tapered surface 104e of the seal-off lid 104. The seal-off lid 104, along with the coating ring 8000, is then threaded into the sealing port 103 of the conduit body 100 until the outer tapered surface 801 engages a corresponding internal tapered surface 103a of the conduit body 100 surrounding the sealing port 103.

With the seal-off lid 104, the coating ring 8000, and the conduit body 100 installed together, the surface coating 108 may be applied to the seal-off fitting 1000 as shown in FIG. 16. The coating ring 8000 prevents the surface coating 108 from being applied to the external tapered surface 104e of the seal-off lid 104 and the internal tapered surface 103a of the conduit body 100. Application of the surface coating 108 to the outer tapered surface 801 of the coating ring 8000 defines a coating flange 108c around the perimeter of the sealing port 103. Additionally, the surface coating 108 may define a sleeve 108d around each conduit port 102. The coating flange 108c may be trimmed with a knife using the coating ring 8000 as a cutting guide. Similarly, any excess surface coating 108 deposited around the perimeter of the seal-off lid 104 may be trimmed with a knife using the coating ring 8000 as a cutting guide.

After the surface coating 108 has been applied to the seal-off fitting 1000 and any excess coating material has been trimmed from the coating flange 108c and/or the seal-off lid 104, the seal-off lid 104, the coating ring 8000, and the conduit body 100 may be disassembled so that the coating ring 8000 may be removed. The seal-off lid 104 may then be reinstalled into the sealing port 103 of the conduit body 100, as shown in FIG. 17, which shows a different style of seal-off lid 104 than FIGS. 15-16. Proper depth of installation of the seal-off lid 104 can be visually validated by inserting the lid 104 into the sealing port 103 until the uncoated external tapered surface 104e of the seal-off lid 104 and the uncoated internal tapered surface 103a of the conduit body 100 are no longer visible. The flame path 105 (not shown) is at least partially defined between the external tapered surface 104e of the seal-off lid 104 and the internal tapered surface 103a of the conduit body 100.

While specific aspects or embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the present disclosure, which is to be given the full breadth of the claims appended and any and all equivalents thereof.

The invention claimed is:

1. A seal-off fitting for a conduit system comprising:
   a conduit body defining:
      an inner cavity;
      at least one conduit port adapted to receive a conduit; and
      at least one threaded sealing port;
   a threaded plug engageable with the sealing port;
   a first coating applied to at least a portion of the conduit body; and
   a second coating applied to at least a portion of the plug,
   wherein at least a portion of the threads of the sealing port and at least a portion of the threads of the plug remain uncoated,
   wherein the uncoated threads of the sealing port and the uncoated threads of the plug define a flame path for flue gases exiting the conduit body,
   wherein at least a top portion of the threads of the plug are coated by the second coating, and
   wherein the first coating is tapered around a periphery of the sealing port to a minimum thickness directly adjacent to the threads of the sealing port.

2. The seal-off fitting of claim 1, further comprising a sealing compound deposited in the inner cavity and at least partially isolating the at least one conduit port from another component of the conduit system.

3. The seal-off fitting of claim 1, wherein the top portion of the threads of the plug coated by the second coating are exposed when the plug is installed in the conduit body.

4. The seal-off fitting of claim 1, wherein the first coating is PVC or urethane.

5. The seal-off fitting of claim 1, wherein the second coating is PVC or urethane.

6. The seal-off fitting of claim 1, wherein the first coating is a different material than the second coating.

7. A seal-off fitting for a conduit system comprising:
a conduit body defining:
an inner cavity;
at least one conduit port adapted to receive a conduit; and
at least one threaded sealing port;
a threaded lid engageable with the sealing port;
a first coating applied to at least a portion of the conduit body; and
a second coating applied to at least a portion of the lid,
wherein at least a portion of the threads of the sealing port and at least a portion of the threads of the lid remain uncoated,
wherein the uncoated threads of the sealing port and the uncoated threads of the lid define a flame path for flue gases exiting the conduit body, and
wherein the first coating is not deposited on an internal tapered surface extending radially outward from and surrounding the sealing port, and
wherein the second coating is not deposited on an external tapered surface of the lid corresponding to the internal tapered surface surrounding the sealing port.

8. The seal-off fitting of claim 7, further comprising a sealing compound deposited in the inner cavity and at least partially isolating the at least one conduit port from another component of the conduit system.

9. The seal-off fitting of claim 7, wherein the uncoated threads of the sealing port and the uncoated threads of the lid are not visible with the lid installed on the conduit body.

10. The seal-off fitting of claim 7, wherein the first coating is PVC or urethane.

11. The seal-off fitting of claim 7, wherein the second coating is PVC or urethane.

12. The seal-off fitting of claim 7, wherein the first coating is a different material than the second coating.

* * * * *